United States Patent [19]
Gebauer

[11] 3,731,041
[45] May 1, 1973

[54] METHOD AND APPARATUS FOR MAKING A TUBE FROM A METAL STRIP

[75] Inventor: Hans Gebauer, 469 Herne, Germany

[73] Assignee: Hoesch Maschinenfabrik Deutschland Aktiengesellschaft, Dortmund, Germany

[22] Filed: June 9, 1971

[21] Appl. No.: 151,287

[30] Foreign Application Priority Data

June 10, 1970 Germany.................P 20 28 560.3

[52] U.S. Cl. ....................219/62, 219/61, 219/87
[51] Int. Cl. ..............................................B23k 1/16
[58] Field of Search.........................219/59–67, 219/124, 125 R, 137, 87, 159

[56] References Cited

UNITED STATES PATENTS

| | | | |
|---|---|---|---|
| 3,495,064 | 2/1970 | Grimoldi | 219/60 R |
| 2,819,379 | 1/1958 | Wiley et al. | 219/62 |
| 3,268,707 | 8/1966 | Thomas | 219/60 A X |
| 3,014,121 | 12/1961 | Thomas | 219/159 |
| 3,004,135 | 10/1961 | Diener et al. | 219/62 |
| 3,612,816 | 10/1971 | Hano | 219/87 X |

Primary Examiner—J. V. Truhe
Assistant Examiner—L. A. Schutzman
Attorney—Michael S. Striker

[57] ABSTRACT

A device is provided for continuously forming a metal strip to consecutive helical convolutions which together constitute a tube. The abutting edges of the successive convolutions, which edges advance in a helical path at a higher first speed, are intermittently tack-welded by an arc-welding unit. Downstream of this unit is located another arc-welding unit which receives the thus partially welded tube and continuously welds the abutting edges, but at a lower speed.

36 Claims, 19 Drawing Figures

INVENTOR
Hans GEBAUER
his ATTORNEY

INVENTOR
Hans GEBAUER

INVENTOR
Hans GEBAUER

By
his ATTORNEY

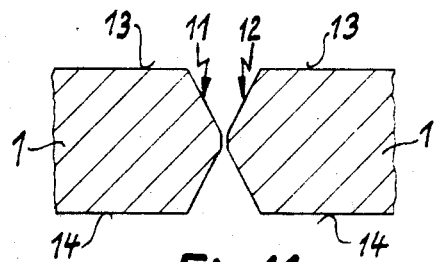
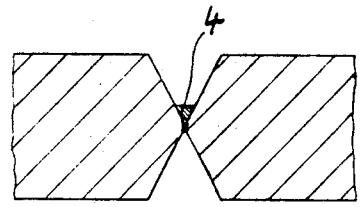
Fig.11    Fig.12
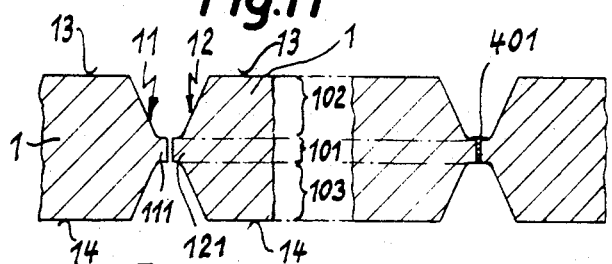
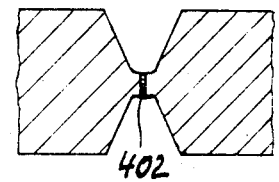
Fig.13    Fig.14    Fig.15
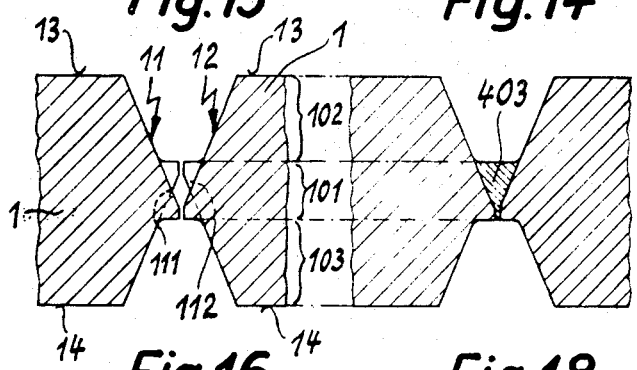
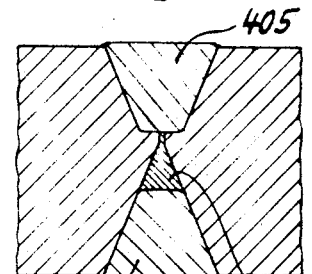
Fig.16    Fig.18    Fig.19
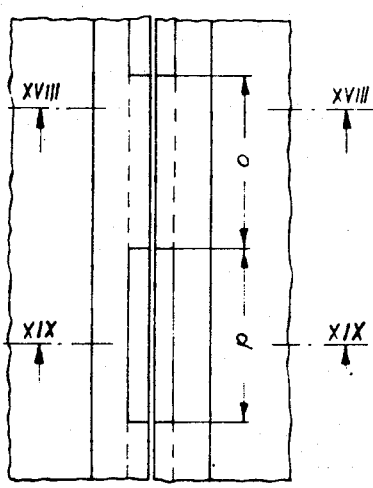
Fig.17
INVENTOR
Hans GEBAUER
By
his ATTORNEY

METHOD AND APPARATUS FOR MAKING A TUBE FROM A METAL STRIP

BACKGROUND OF THE INVENTION

The present invention relates to the making of tubes from metallic strip, and more particularly to a method of making a tube from helically convoluted metallic strip and to an apparatus for carrying out the method.

The making of tubes from helically convoluted metallic strip is not novel per se. It is known to so convolute the strip that the adjacent edges of consecutive convolutions abut, and thereupon to connect the abutting edges by arc welding, with the result that the finished structure is a tube with a continuous helically convoluted welding seam following the line of abutment of the strip edges of consecutive convolutions. The finished tube thus obtained moves out of the tube-forming device, in which the convolution and welding take place, at a speed which depends upon the welding speed and upon the pitch of the helical convolution of the weld. This pitch, which is determined by the quotients band or strip width to tube circumference, can be assumed to be constant during the manufacture of a particular tube, so that the tube speed is proportional to the welding speed.

The problem with this approach is that it is not entirely satisfactory. In particular, the combination of strip forming and finish welding in a single operational stage has the disadvantage that in certain circumstances the manufacture of the tube must be interrupted, for instance when the ends of consecutive strips must be welded together, when malfunctions occur during the strip deformation or winding, or when the strip-deforming device must be adjusted for a different strip width. The latter is particularly disadvantageous, because if such adjustments be made fairly frequently, and this of course includes also adjustments for different tube diameters, the necessary interruptions in the operation can be so long with reference to the welding time of a particular tube, that an economical manufacturing of the tube is no longer assured, particularly considering the basically relatively low welding speed which obtains in such devices.

A further disadvantage resulting from interruptions which are caused by welding together successive strips and also by malfunctions in the band-deforming device, resides in the disadvantageous consequences this has on the welded seam, because the switching on and off of the arc-welding unit or units causes the formation of craters or pits which, if not structurally weakening of the tube, are at least aesthetically displeasing.

SUMMARY OF THE INVENTION

It is, accordingly, an object of the present invention to overcome the aforementioned disadvantages.

More particularly it is an object of the present invention to provide an improved method of making a tube from a helically convoluted metal strip.

A further object of the invention is to provide such an improved method which permits a more advantageous and more economical manufacturing of such tube.

A concomitant object of the invention is to provide an apparatus for carrying out the novel method.

In pursuance of the above objects, and of others which will become apparent hereafter, one feature of the invention resides in the novel method of making a tube from a metal strip, which method briefly stated comprises the steps of continuously feeding a metal strip in a predetermined direction, continuously helically convoluting the strip and forming from the same a tube composed of consecutive convolutions having abutting edges which advance to a first speed in a helical path and intermittently tack-welding the abutting edges at a first welding station and while they advance at the aforementioned first speed. The tube with the thus tack-welded edges is advanced in an axial path and the abutting edges are advanced at a lower second speed, and the tack-welded abutting edges are then continuously finish-welded at a second welding station downstream of the first welding station and while the abutting edges move at the lower second speed, whereby to form a tube composed of consecutive convolutions which are joined by a continuous helical welded seam.

The tube having the tack-welded abutting edges is severed into individual sections intermediate the first and the second welding station. The welding stations each comprise at least one arc-welding unit which may be located interiorly and/or exteriorly of the tube. If they are located both at the interior and the exterior of the tube, the edges of the strip being convoluted are bevelled and are provided with a longitudinally extending rib of right-angular cross-section intermediate the opposite major surfaces of the strip. The bevels extending from this rib to the respective major surface are inclined relative to the latter at an obtuse angle. If the abutting edges are to be tacked with V or Y welds, the right-angular ribs are themselves bevelled alternately from one and the other side of the strip.

The helical convolution of the strip takes place in a deforming device having the first welding station in form of at least one arc-welding head which can be pivoted about the axis of the tube being formed in parallelism with the helical abutting edges, and there is further provided in the second welding station at least one arc-welding head for effecting the finished welding. The single or several welding heads of the first welding station is or are mounted on an arm which is pivotable about the longitudinal axis of the tube being formed and which can be displaced in direction of this axis. A journal is provided for mounting the arm and is connected with the latter in an adjustable sense.

The supply device for supplying and advancing the welding wire is fixed with the arm.

The pivotal movement of the arm is effected by a geared motor and two adjustable abutments limit the circumference of the arm about the tube axis, each arm cooperating with a contact switch or the like which in turn is connected with the geared motor to control the operation thereof. The longitudinal displacement of the arm is carried out by a displacing device which is controlled by an optical sensing device, a so-called light point optic, which is mounted on the arm and controls the operation of the displacing device. However, it is also possible to provide the arm with a projection on which a copying roller is mounted which is biased by a suitable spring against the abutting helical edges of the convolutions. Of course, the arm may carry not a single arc-welding head but two or more of them if desired.

It is preferable although not necessary that the arm be configured as a carriage provided with wheels which are in rolling contact with the inner or outer side of the tube formed by the consecutive convolutions, and sprung rollers are advantageously provided as the wheels. Two displacing devices then serve for displacing the carriage in mutually opposite directions of the tube.

The arc-welding device constituting or forming a part of the second welding station for finish-welding the tacked abutting edges, utilizes at least one arc-welding head which is displaceable on a carrier and is provided with a plurality of pairs of rollers for engaging and turning the severed tube sections about their longitudinal axes. Two rollers provided in this device serve for retaining the tacked but not yet finish-welded tube section against displacement in axial direction. The single (or, if desired, several) arc-welding head of the second welding station is mounted on a ring mount of a carriage, and a guide for guiding the carriage is mounted in a housing and adjustable in vertical direction and transversely to the tacked tube section. One end of the guide is supported by a displacing device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a section taken on line III—III of FIG. 1, corresponding in all details to FIG. 1 except that the arc-welding head is located at the exterior of the tube rather than the interior as shown in FIG. 1;

FIG. 11 is a fragmentary detail view, on an enlarged scale, showing two adjacent almost abutting edges bevelled according to one embodiment;

FIG. 12 illustrates the embodiment of FIG. 11 provided with a Y tack weld;

FIG. 13 is a view similar to FIG. 11 illustrating a different bevel embodiment of the edges of adjacent convolutions;

FIG. 14 is a view similar to FIG. 12, but of FIG. 11, illustrating one seam;

FIG. 15 is a view similar to FIG. 14 illustrating a different seam;

FIG. 16 is a view similar to FIG. 13 illustrating a different embodiment;

FIG. 17 is a top-plan view of FIG. 16;

FIG. 18 is a section taken on line XVIII—XVIII in FIG. 17 showing a Y-type tack weld; and FIG. 19 illustrates FIG. 18 but provided with a Y-type tack weld from a side other than that shown in FIG. 18 and further provided with two finished welded seams.

DESCRIPTION OF THE PREFERRED EMBODIMENTS

Figure 1:
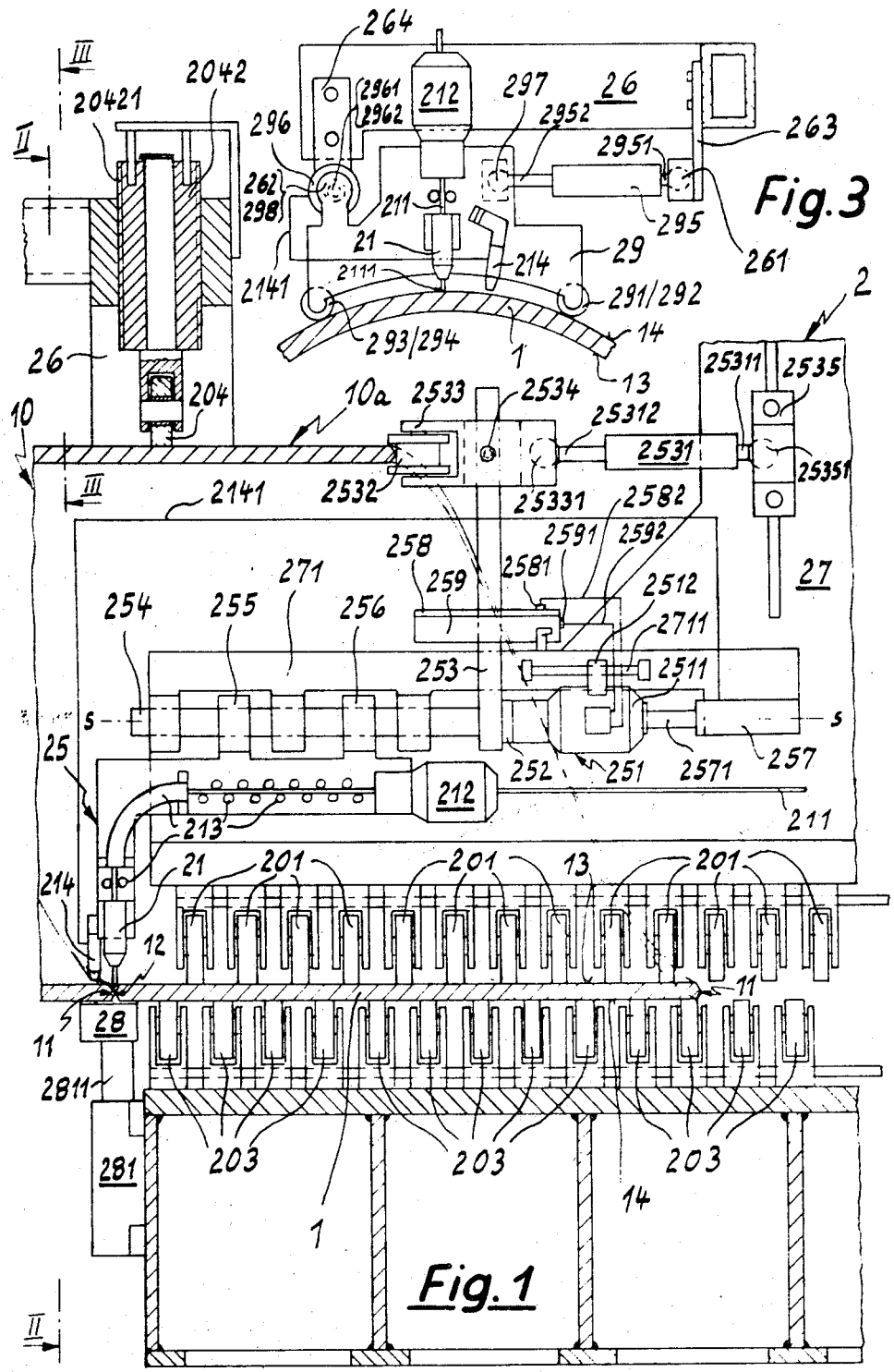
FIG. 1 is a fragmentary longitudinal section through that part of the novel apparatus wherein the strip sections are helically convoluted and tack-welded.
Figure 2:
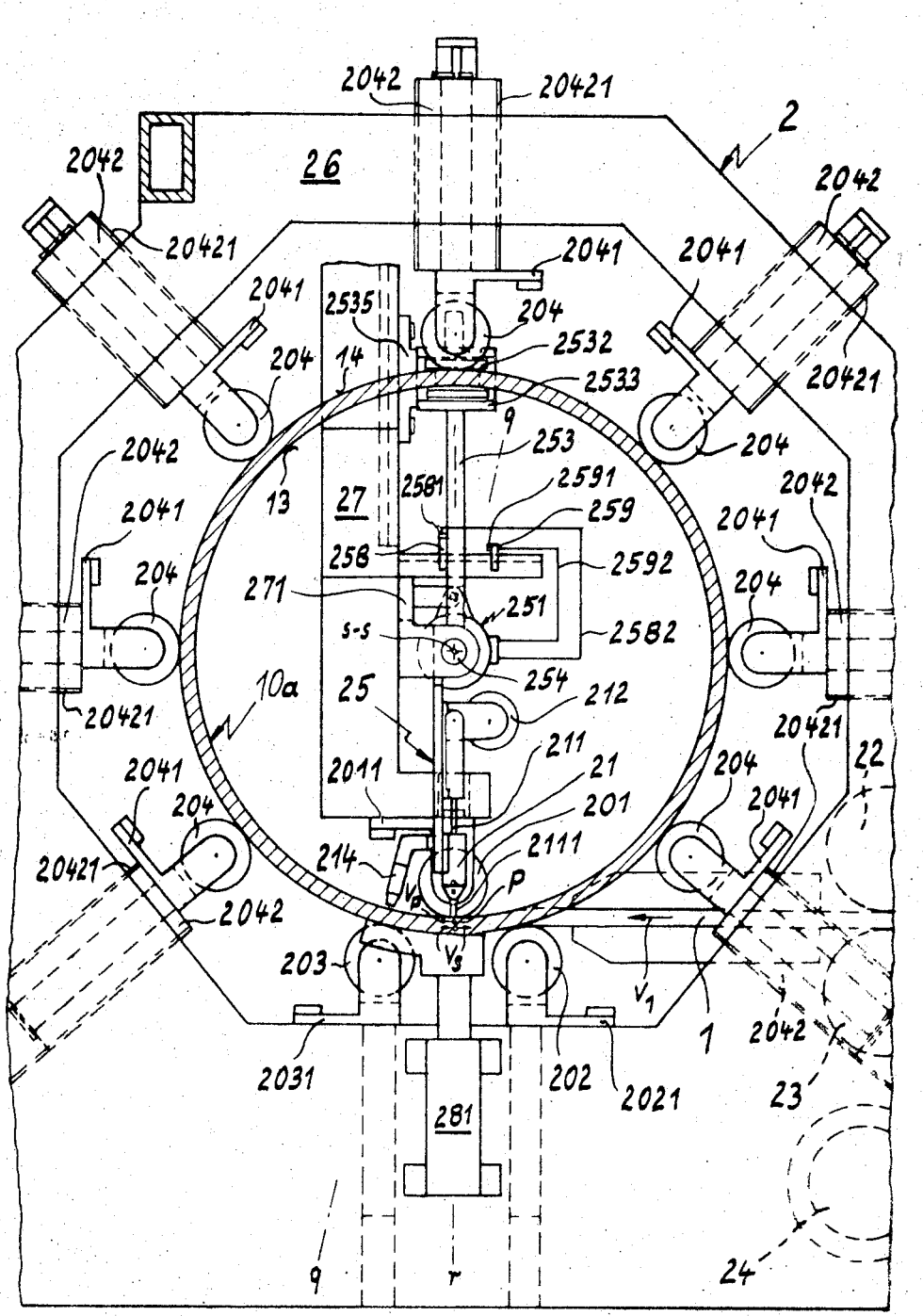
FIG. 2 is a section taken on line II—II of FIG. 1.
Figure 4:
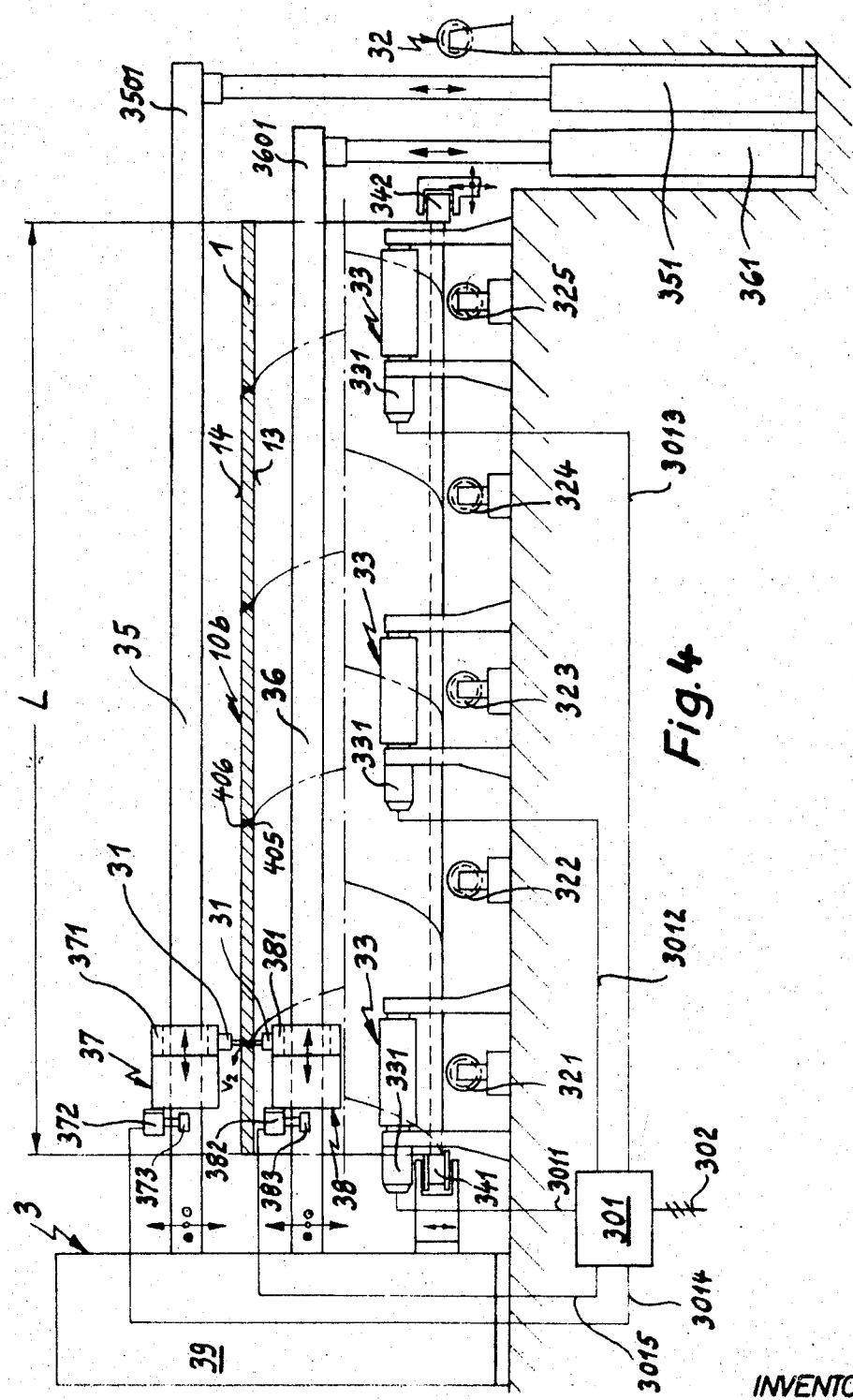
FIG. 4 illustrates a welding unit for finish-welding the tack-welded abutting edges.

Discussing the drawing now in detail, and firstly FIGS. 1-4, it will be seen that the novel apparatus for carrying out the novel method utilizes a deforming device 2 which deforms a metallic strip or band 1 having edges 11 and 12. The band 1 is deformed by the device 2 to the shape of successive helical convolutions, and an arc-welding head 21 can be pivoted in parallelism with the edges 11 and 12 of the successive convolutions. The apparatus further comprises a welding station 3 in which the tube which is temporarily produced by tack-welding via the welding head 21 is finish welded. The tube, or rather the tube section, is identified with reference numeral 10b.

Figure 5:
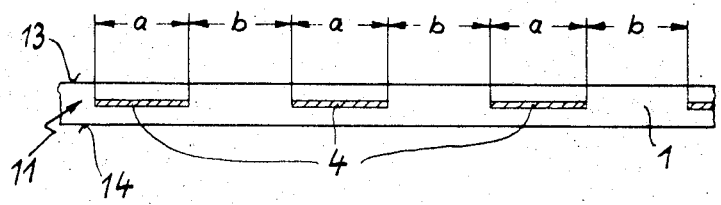
FIG. 5 is a fragmentary longitudinal section through a tack-welded seam.

The band or strip 1 of suitable metallic material is advanced by a pair of drive rollers 22 and 23 which are driven by a geared motor 24, advantageously of the type whose revolutions per minute can be varied in order to obtain the possibility of varying the strip speed. The rollers 22 and 23 advance the strip 1 at a high speed $v_1$ into the forming unit 2, and it will be understood that the speed $v_1$ is higher than the welding speed $v_s$. During the deformation of the strip 1 in the unit 2 by means of several bending rollers 201, 202 and 203 which together constitute a three-roller bending system of known construction, the arc-welding head 21—which is mounted on an arm 25—tack-welds the adjacent or abutting strip edges 11 and 12 at spaced locations, that is intermittently to provide the intermittent tack welds 4 shown in FIG. 5. The length of one of these tack welds 4 is designated with character a and the length of the spaces between consecutive ones of the tack welds 4 with reference character b. It will surely be understood, and is mentioned here only for the sake of completeness, that the adjacent edges of consecutive strip convolutions may be moved into abutment prior to tack-welding, or can be slightly spaced from one another, as requirements may dictate. Moreover, it is here stated—though it is thought to be already understood and clear—that the term tack-welding as used herein indicates that the weld seams are larger than ordinary spot welds, and serve to temporarily "tack" together the strip edges until the final continuous weld.

A housing 26 of the apparatus has mounted thereon rollers 204 which engage the leading end 10a of the tube to prevent it from radial and axial displacement. The rollers 201–204 can be adjusted by means of levers 2011, 2021, 2031 and 2041, respectively, to the pitch angle of the leading end 10a. When it is necessary to adjust the rollers 204 to accommodate them to a different tube diameter, the roller mounts 2042 are turned, being provided for this purpose with an external thread 20421. The height adjustment of the bending rollers 201, which must take place when a diameter of the tube to be produced is readjusted, is carried out by an internal arm 27. The welding support 28 is mounted on the piston rod 2811 of a hydraulically or otherwise operated cylinder 281.

The arc-welding head 21 is mounted, as already pointed out before, on an arm 25 and, when it tack-welds the strip edges 11 and 12, the head 21 moves in a helical path in parallelism with the abutting or adjacent strip edges 11 and 12 in the direction of movement of the strip 1. This movement of the head 21 takes place in such a manner that the welding point P can advance or travel in the same direction as the strip 1 with a speed $v_p$. This speed normally is the product of the difference of the strip (or strip edge) speed $v_1$ less the welding speed $v_s$.

It will be appreciated, of course, that the arc-welding head 21 does not perform a complete revolution about the axis of the tube being formed. Instead, after it has formed a tack weld having the length a, the head 21 is pivoted from its terminal position $q-q$ to its original or starting position $r-r$ (see FIG. 2) whereby the end portion 2111 of the welding wire travels a distance corresponding to the length b between consecutive tack-welds 4. The speed of return movement of the arc-welding head 21 is not dependent upon or related to the welding speed $v_s$ which means that, if the head 21 is returned at high speed, a brief return time is required which does not significantly reduce the welding capacity of the head 21.

It is pointed out that if the speed $v_p$ of the welding point P were equal to the sum of tape (or tape edge) speed $v_1$ plus the welding speed $v_s$, then on reaching the length a of a tack-weld 4 the end portion of the welding wire 2111 would have to be moved by a distance $2a + b$.

Figure 6:
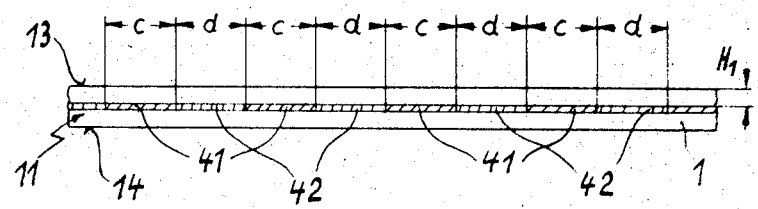
FIG. 6 is a view similar to FIG. 5 showing a different seam.
Figure 7:
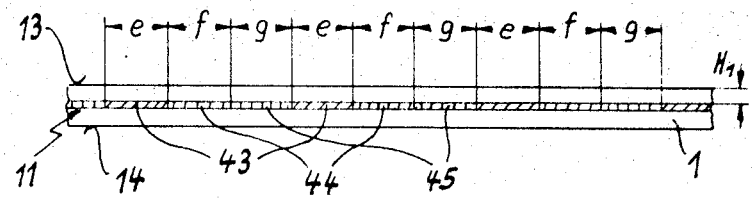
FIG. 7 is a view similar to FIG. 6 showing another seam.
Figure 8:
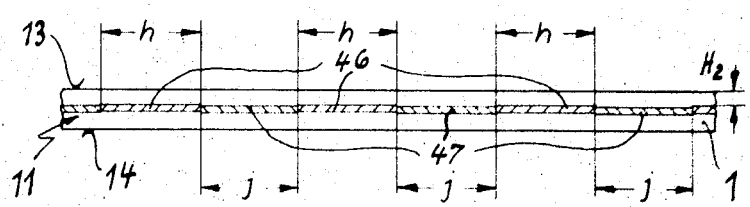
FIG. 8 is a view similar to FIG. 7 showing a further seam.

When the strip edges 11 and 12 are tack-welded by means of two or three welding heads 21 located at the inner or outer sides 13, 14 of the strip, then the intermittent or interrupted tack-welded seams 41, 42, 43, 44 and 45 are located at the same level $H_1$ (see FIGS. 6 and 7), assuming identical configuration of the strip edges. The length c, d, e, f and g of the intermittent welding seams 41, 42, 43, 44 and 45 are so coordinated with the strip (or strip edge) speed $v_1$, the speed $v_s$ and the return speed of the welding heads 21, that a continuous tack-welding of the strip edges 11 and 12 is obtained.

If the strip edges are profiled in the manner shown in FIG. 11, and if one tack-welding heads 21 is located at the inner side 13, and another tack-welding head is located at the outer side 14 of the convoluted strip 1, the interrupted or intermittent tack-welding seams 46 and 47 are not located at the same level $H_2$. It will be seen that the tack-welding seams 46 with the length h are associated with the inner arc-welding head 21, whereas the tack-welding seams 47 with the length j are associated with the outer arc-welding head 21.

Figure 9:
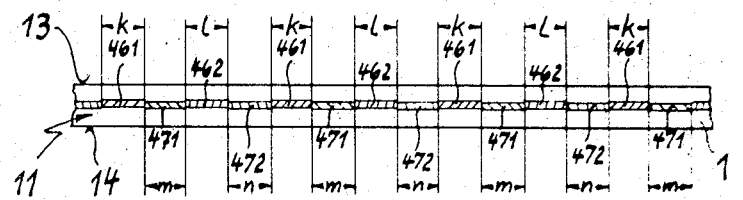
FIG. 9 is a view similar to FIG. 8 showing still an additional seam.
Figure 10:
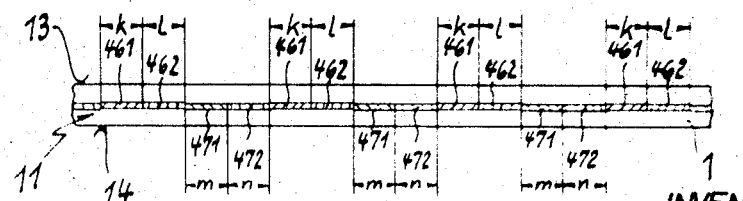
FIG. 10 is a view similar to FIG. 9 showing yet one other seam.

If, on the other hand, two arc-welding heads 21 are located at the inner side 13 and two additional arc-welding heads 21 are located at the outer side 14 of the convoluted strip 1, as is assumed with respect to the embodiment illustrated in FIGS. 9 and 10, somewhat similar circumstances obtain. Here, the tack-welded seams 461 and 462 with their respective lengths k and l are associated with the two inner arc-welding heads 21, whereas the tack-welded seams 471 and 472 with their associated lengths m and n are associated with the outer arc-welding heads 21.

The configuration of the strip edges as shown in FIG. 11 is the customary and usual configuration and will be adequate if one or more arc-welding heads 21 are to be located only at one of the strip sides 13 and 14. In FIG. 12 I have illustrated the cross-sectional configuration of a Y-shaped tack-weld 4 obtained on welding the juxtaposed edges 11 and 12 shown in FIG. 11.

On the other hand, FIG. 13 shows a different configuration of the strip edges 11 and 12. This is utilized when it is necessary to guarantee a uniform tack-weld and when the welding heads 21 are located at the inner and outer sides 13 and 14 of the convoluted strip 1. In such a case the edges are again bevelled in mutually opposite directions from their respective major surfaces 13 and 14 (the inner and outer side of the convoluted strip), but substantially midway intermediate these inner and outer sides 13 and 14 each edge is provided with a longitudinally extending rib 101 with substantially right-angular cross-sectioned portions 111 and 121. In the regions 102 and 103 the edges 11 and 12 are bevelled at obtuse angles as shown in FIG. 13. As FIGS. 14 and 15 show, a thus-configurated strip can have the edges 11 and 12 tack-welded with interrupted I-cross-section tack-welding seams 401 and 402.

If the strip edges 11 and 12 are to be tack-welded with welded seams of V-shaped or Y-shaped cross-section, as shown at 403 and 404 in FIGS. 18 and 19, then the portions 111 and 121 are alternately bevelled from one and the other side 13, 14 as shown in FIG. 16. The length O (FIG. 17) is associated with the V-shaped or Y-shaped welded seam 403, and the length p with the V-shaped or Y-shaped welded seam 404.

It will be appreciated that the tack-welding of the consecutive convolutions into which the strip 1 is formed results in the formation of a temporarily or tack-welded tube 10. This tube 10 advances in axial direction during the continuous formation of additional helical convolutions, and during such advancement tube sections 10b having a length L are severed from the advancing tube by a non-illustrated severing device which is known per se and which is associated with the outlet of the unit 2.

The thus-severed sections 10b are finish-welded at a lower speed $v_2$ in the welding device 3 which is located downstream (as seen with reference to the direction of advancement of the tube 10 and the sections 10b) of the unit 2 and the welding head or heads 21. The lower welding speed $v_2$ corresponds to the welding speed of the arc-welding head 31 located at the outer side 14 of the strip convolutions which together make up the respective tube section 10b. Each of the thus-obtained finished welded seams 405 and 406 is of substantially trapezoidal cross-section as shown in FIG. 19.

Returning to FIGS. 1–4, it will be seen that the arc-welding head 21 associated with the unit 2 is mounted on the arm 25, with the latter being pivotable about the longitudinal axis of the tube (the axis is identified as $s-s$), and which is also displaceable in longitudinal direction of this axis. A journal 271 mounts the arm 25 and is adjustably connected with the inner element 27. When the device is to be adjusted for producing a tube of a different diameter than previously, first the journal 271 is adjusted with reference to the inner element 27, and then the welding head 21 with reference to the arm 25. Welding wire 211 is supplied to the arc-welding head 21 via an advancing device 212 which is fast with the arm 25, and via guides 213.

A geared motor 251 is provided which is connected with the arm 25 via a coupling 252, a lever 253, a rod 254 and two hubs 255 and 256. It is the motor 251 which produces pivotal movement of the arm 25 about the longitudinal axis of the tube. The longitudinal or axial displacement of the arm 25 with reference to the tube is effected by a displacing device 257 which is connected with the journal 271 and provided with a pusher 2571 which is threadedly connected with the housing 2511 of the geared motor 251. The restoring moment of the geared motor 251 is transmitted to and absorbed by a support 2512 which is displaceable on a guide 2711 connected with the journal 271. The term journal as applied with respect to the element 271 is intended herein to designate a bearing support.

As pointed out before, the arm 25 carrying the head 21 is not allowed to perform a complete movement circumferentially of the tube axis. In order to limit it to a movement of a certain portion of arc, there are provided two abutments 258 and 259 which can be adjusted to the pivotal angle of displacement of the lever 253. They are provided with respective contact switches 2581 and 2591 which are connected in turn via connectors 2582 and 2592 respectively, with the geared motor 251. After the arm 25 has completed its pivotal movement in one circumferential direction the respective contact switch 2581 or 2591 acts upon the geared motor 251 to cause the latter to reverse its direction of rotation whereupon the arm returns to its previous end position.

The displacing device 257 must also be controlled in its movement effecting longitudinal displacement of the arm 25. For this purpose an optical sensing device, here illustrated as a light point optic 214 known per se, is mounted on the arm 25 and its beam is directed at one of the helically convoluted strip edges 11 or 12. A conductor 2141 connects the device 214 with the displacing device 257. In known manner the device 214 controls the operation of the device 257 and causes the latter to displace the arm 25 alternately in one and the opposite direction of the tube being formed.

It is pointed out that the control of the arc-welding head 21, or rather the movement thereof, can also be effected via a copying roller 2532 which is mounted on a portion 253 of the arm 25 and which is permanently biased by a spring 2531 against one of the helically convoluted strip edges 11 or 12. In such a case the copying roller 2532 will be provided with a housing 2533 which is mounted on the portion 253 of the arm 25 by means of a clamping screw 2534. When this screw has been loosened, the copying roller 2532 can be adjusted with reference to the portion 253 to thereby provide an adjustment for different tube diameters and different strip widths. An element 2535 is mounted on the inner element 27 adjustably, to support the spring 2531; it is connected via a ball joint 2531 with the right-hand end 25311 of the spring 2531. The left-hand end 25312 of this spring is connected with the ball joint 25331 of the housing 2533. When this embodiment is chosen, the light point optic 214 and the displacing device 257 are not necessary and can be dispensed with.

Two or more arc-welding heads 21 may be mounted on an arm 25 for tack-welding the strip edges 11 and 12. These heads 21 can be offset with reference to one another by one helical convolution.

The arm 25 is preferably constructed as a carriage 29 having wheels 291, 292, 293 and 294. FIG. 3 shows that these wheels may be in rolling engagement either with the inner or outer side 13 or 14 of the convoluted strip 1, that is with the inner or outer side of the tube formed from the strip. Advantageously but not necessarily the wheels 291–294 may be constructed as sprung ball rollers, and the carriage 29 has movement imparted to it by two displacing devices 295 and 296 which are connected at their respective ends 2951 and 2961 via ball bearings 261 and 262 and holders 263 and 264 to the housing 26. The opposite ends 2952 and 2962 of the respective devices 295 and 296 are connected via ball joints 297 and 298 with the carriage 29.

Of the devices 295 and 296, the latter effects movement of the carriage 29 in axial direction of the tube and is controlled by the light point optic 214 provided on the carriage 29. A copying roller 2532 may be provided on the carriage 29 in the manner previously described with respect to the arm 25 for effecting control over the arc-welding head 21, with a spring 2531 providing the necessary biasing action for the roller.

When a section 10b has been severed from the tacked tube 10, it passes to the welding station 3 via a roller conveyor 32. The latter has rollers 321, 323, 324 and 325 which are lowered once the section 10b has reached the station 3, whereupon the section 10b is engaged by three pairs of rollers 33. Rollers 341 and 342 maintain the section 10b against axial displacement.

The welding station 3 in the illustrated embodiment comprises two arc welding heads 31 for effecting finish welding of the tack-welded strip edges of the section 10b. These heads 31 are respectively mounted on carriages 37 and 38 which are displaceable on guides 35 and 36. A ring mount 371 is provided on the carriage 37, and a similar ring mount 381 is provided on the carriage 38, thus permitting a displacement of each of the heads 31 through 360°. If the cross-section of the finished welded seam to be produced (405, 406 in FIG. 19) is relatively large, then it is advantageous to mount two or more of the heads 31 on each of the carriages 37, 38.

The guides 35 and 36 along which the carriages 37 and 38 are respectively movable are mounted in a housing 39 for adjustment and displacement vertically and transversely to the section 10b. Displacing devices 351 and 361 respectively support the ends of the guides (identified with reference numerals 3501, 3601) during the finish welding operation.

The welding speed in the device 3 corresponds to the speed $v_2$ of a point on the helical line surrounding the tube section 10b, is effected by turning the tube section 10b about its longitudinal axis, and at the same time displacing the welding head or heads 31 in axial direction of the section 10b. The roller pairs 33, which are driven synchronously by a suitable motor 331, engage and turn the section 10b about its longitudinal axis. A drive motor 372 on the carriage 37, and another drive motor 382 on the carriage 38, respectively act via friction rollers 373 and 383 (supported by the guides 35 and 36) serve for effecting the longitudinal displacement of the respective welding heads 31 with reference to the axis of the tube.

A circuit 301 controls the circumferential speed of the section 10b and the axial speed of the welding head or heads 31. It is connected via conductors 3011, 3012, 3013, 3014 and 3015 with the motors 331, 372 and 382, and receives its electrical energy from a supply 302, for instance a net.

Resort to the present invention in which welding takes place in two stages in the first one of which the edges of the consecutive convoluted strip sections are only tacked by intermittent welds, whereas they are continuously welded together in the second stage, overcomes the earlier described disadvantages of the prior art. Also, the present invention makes it possible to use arc-welding heads for all welding functions, which is an advantage over some proposals of the prior art according to which welding is to be partially or completely carried out by resistance welding, an approach which is not satisfactory in many respects, especially if the strip is relatively thick because the strip edges cannot be prepared and welded with an accuracy of several hundredths of a millimeter.

It will be understood that each of the elements described above, or two or more together, may also find a useful application in other types of applications, differing from the types described above.

While the invention has been illustrated and described as embodied in an apparatus for forming tubes from helically convoluted metal strips, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of making a tube from a metal strip, comprising the steps of continuously feeding a metal strip in a predetermined direction continuously helically convoluting said strip and forming from the same a tube composed of consecutive convolutions having abutting edges which advance at a first speed in a helical path; intermittently tack-welding said abutting edges at a first welding station and while they advance at said first speed; shifting said tube with the thus tack-welded edges forwardly in said predetermined direction and away from said first welding station; thereupon advancing the abutting edges of the thus shifted tube in a helical path and at a lower second speed; and continuously finish-welding the tack-welded abutting edges at a second welding station downstream of said first welding station and while said abutting edges move at said lower second speed, so as to form a tube composed of consecutive convolutions joined by a continuous helical welded seam.

2. A method as defined in claim 1, wherein the steps of tack-welding and of finish welding are carried out by arc welding.

3. A method as defined in claim 1, wherein the steps of shifting said tube comprises severing the tube into individual sections intermediate said first and second welding stations, and shifting each severed section to said second welding station.

4. A method as defined in claim 1, wherein the step of tack-welding comprises advancing said first welding station in said helical path at said first speed from a starting position to a terminal position so as to maintain it juxtaposed with a portion of said abutting edges, welding the thus juxtaposed portion of said abutting edges, and returning said first welding station to said starting position.

5. A method as defined in claim 1, said strip having two opposite major surfaces and said edges each extending from one to the other of said major surfaces; and further comprising the step of bevelling said edges prior to helically convoluting said strip.

6. A method as defined in claim 5, wherein the step of bevelling said edges comprises providing each of said edges with two bevelled facets which are inclined towards one another in opposite directions from the respective major surfaces.

7. A method as defined in claim 6, wherein the step of bevelling said edges comprises providing each of said edges with a longitudinally extending rib of substantially right-angular cross-section and located intermediate said bevelled facets.

8. A method as defined in claim 7; and further comprising the step of also bevelling said rib, alternately from the direction of one of said major surfaces towards the other and vice versa.

9. A method as defined in claim 7, wherein the step of bevelling comprises so forming said facets that they each include an acute angle with the respectively associated major surface.

10. In an apparatus for making tubes from metal strips, in combination, first means for continuously helically convoluting an advancing metal strip to form therefrom a tube advancing in a predetermined direction and composed of consecutive convolutions having abutting edges which advance at a first speed and in a first helical path; second means for intermittently tack-welding said abutting edges while the same advance at said first speed; shifting means for shifting said tube with the thus tack-welded seams forwardly in said predetermined direction and away from said second means; third means for advancing said abutting edges of the thus shifted tube in a second helical path but at a lower second speed; and fourth means for continuously finish-welding the tack-welded abutting edges while the same move at said lower second speed.

11. In an apparatus as defined in claim 10, said second means comprising at least one welding unit, and advancing means for advancing said one welding unit periodically in unison with portions of said abutting edges in said first helical path and at said first speed.

12. In an apparatus as defined in claim 11, said second means comprising at least one other welding unit.

13. In an apparatus as defined in claim 12, wherein said welding units are arc-welding units.

14. In an apparatus as defined in claim 12, said tube having a longitudinal axis; and further comprising at least a pair of arms each mounting one of said welding units and each being mounted for displacement longitudinally of said axis and for pivotal movement thereabout.

15. In an apparatus as defined in claim 14; further comprising mounting means mounting the respective arms for the movements thereof.

16. In an apparatus as defined in claim 15, said mounting means for each of said arms comprising a journal mounted on the respective arm for adjustment in its position relative to such arm.

17. In an apparatus as defined in claim 14; and further comprising supply means fast with the respective arms and operative for supplying welding wire to the respectively associated welding unit.

18. In an apparatus as defined in claim 14; and further comprising geared motor means operative for effecting said movement of the respective arms.

19. In an apparatus as defined in claim 14; and further comprising displacing means operative for effecting said movements of the respective arms.

20. In an apparatus as defined in claim 14, said arms each being pivotable about said axis in opposite circumferential directions; and further comprising abutment means associated with each of said arms and operative for limiting pivoting movement of the respective arm in said directions.

21. In an apparatus as defined in claim 20; further comprising displacing means operative for effecting said movements of the respective arms, and control means initiating and terminating operation of said control means; and wherein said abutment means cooperates with said control means.

22. In an apparatus as defined in claim 20; further comprising geared motor means operatively associated with said arms for effecting said pivotal movement of the same; control means initiating and terminating operation of said motor means and being operatively associated with said abutment means so as to be operated in response to engagement of the same by the respective arms; displacing means for effecting said displacement of the same longitudinally of said axis; and optical means carried by the respective arms and operative for controlling operation of said displacing means in dependence upon the degree of longitudinal displacement of said arms.

23. In an apparatus as defined in claim 14; further comprising cam-roller means mounted on the arm mounting said one welding unit and being in engagement with said abutting edges of said convolutions, and spring means permanently biasing said cam roller means to such engagement.

24. In an apparatus as defined in claim 14, one of said arms having said one welding unit mounted thereon; and further comprising at least an additional welding unit also mounted on said one arm.

25. In an apparatus as defined in claim 14, said tube having an inner and an outer side, and said arms being constructed as carriage units and comprising wheels in rolling engagement with one of said sides.

26. In an apparatus as defined in claim 25, wherein said wheels engage said inner side.

27. In an apparatus as defined in claim 25, wherein said wheels engage said outer side.

28. In an apparatus as defined in claim 25, wherein said wheels are spring-loaded rollers.

29. In an apparatus as defined in claim 25, further comprising displacing means for effecting displacement of said carriage units with reference to the axis of said tube.

30. In an apparatus as defined in claim 12, said one other welding unit comprising at least one arc-welding head and a guide mounting the same for displacement relative to said tube; and further comprising roller means engaging said tube in the region of said second welding unit and operative for turning said tube about the longitudinal axis thereof.

31. In an apparatus as defined in claim 30; further comprising severing means for severing respective sections of said tube intermediate said first and second welding units, said roller means engaging the respectively severed sections; and further comprising holding means for holding said sections against axial displacement while engaged by said roller means.

32. In an apparatus as defined in claim 25, at least one of said carriage units comprising at least one ring-mount; and wherein said fourth means comprises at least one arc-welding head mounted on said ring-mount for displacement circumferentially of the same.

33. In an apparatus as defined in claim 32, said fourth means further comprising at least one further arc-welding head also mounted on said ring-mount for displacement circumferentially of the same.

34. In an apparatus as defined in claim 32; further comprising guide means supporting said one carriage and being adjustable relative to said section in a vertical direction and in a direction inclined to said vertical direction.

35. In an apparatus as defined in claim 34, said guide means comprising a guide rail having a free end portion; and further comprising displaceable support means engaging and displaceably supporting said free end portion.

36. In an apparatus as defined in claim 10; further comprising electrically operable means for effecting operation of said first through fourth means; and circuit means operatively associated with and connecting said electrically operable means with said first through fourth means.

* * * * *